US009806387B2

(12) United States Patent
Frutschy et al.

(10) Patent No.: US 9,806,387 B2
(45) Date of Patent: Oct. 31, 2017

(54) ENERGY STORAGE DEVICE WITH REDUCED TEMPERATURE VARIABILITY BETWEEN CELLS

(71) Applicant: General Electric Company, Schenectady, NY (US)

(72) Inventors: Kristopher John Frutschy, Clifton Park, NY (US); James S. Lindsey, Schenectady, NY (US); Kanthi Latha Bhamidipati, Rochester Hills, MI (US); James Thorpe Browell, Saratoga, NY (US); Ross M. Snyder, II, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 14/843,164

(22) Filed: Sep. 2, 2015

(65) Prior Publication Data

US 2017/0062884 A1    Mar. 2, 2017

(51) Int. Cl.
*H01M 10/617* (2014.01)
*H01M 10/613* (2014.01)
(Continued)

(52) U.S. Cl.
CPC ....... *H01M 10/617* (2015.04); *H01M 10/613* (2015.04); *H01M 10/627* (2015.04);
(Continued)

(58) Field of Classification Search
CPC ............. H01M 10/617; H01M 10/613; H01M 10/627; H01M 10/6556; H01M 10/6565; H01M 10/6566; H01M 10/6554; H01M 2/1077; H01M 2/1088; H01M 10/39; H01M 2220/10
(Continued)

(56) References Cited

U.S. PATENT DOCUMENTS 3,745,048 A    7/1973  Dinkler et al.
2013/0052491 A1  2/2013  Bull et al.

FOREIGN PATENT DOCUMENTS

DE    102013021531 A1    6/2015
EP       2398108 A1   12/2011

OTHER PUBLICATIONS www.espacenet.com machine translation of the detailed description of DE 102013021531A1 (Jun. 18, 2015).*

(Continued)

*Primary Examiner* — Gregg Cantelmo
(74) *Attorney, Agent, or Firm* — Dority & Manning, P.A.

(57) ABSTRACT

The present disclosure is directed to an improved energy storage device having a housing with one or more side walls that define an internal volume. The side walls include a bottom side wall and a front side wall having an air inlet and outlet. The energy storage device also includes a plurality of cells arranged in a matrix within the internal volume atop the bottom side wall. Further, the cells define a top surface. In addition, the energy storage device includes an airflow distribution network configured with the air inlet and the air outlet. Moreover, the airflow distribution network is at least partially sealed from the plurality of cells (e.g. at the front side wall) so as to reduce temperature variability across the cells when external air is provided through the air inlet.

16 Claims, 13 Drawing Sheets

(51) Int. Cl.
    *H01M 10/627*     (2014.01)
    *H01M 10/6556*     (2014.01)
    *H01M 10/6565*     (2014.01)
    *H01M 10/6566*     (2014.01)
    *H01M 10/6554*     (2014.01)
    *H01M 2/10*     (2006.01)
    *H01M 10/39*     (2006.01)

(52) U.S. Cl.
    CPC ... *H01M 10/6556* (2015.04); *H01M 10/6565* (2015.04); *H01M 10/6566* (2015.04); *H01M 2/1077* (2013.01); *H01M 2/1088* (2013.01); *H01M 10/39* (2013.01); *H01M 10/6554* (2015.04); *H01M 2220/10* (2013.01)

(58) Field of Classification Search
    USPC .......................................................... 429/120
    See application file for complete search history.

(56) References Cited

OTHER PUBLICATIONS

International Search Report and Written Opinion issued in connection with corresponding Application No. PCT/US2016/043319 dated Oct. 14, 2016.

\* cited by examiner

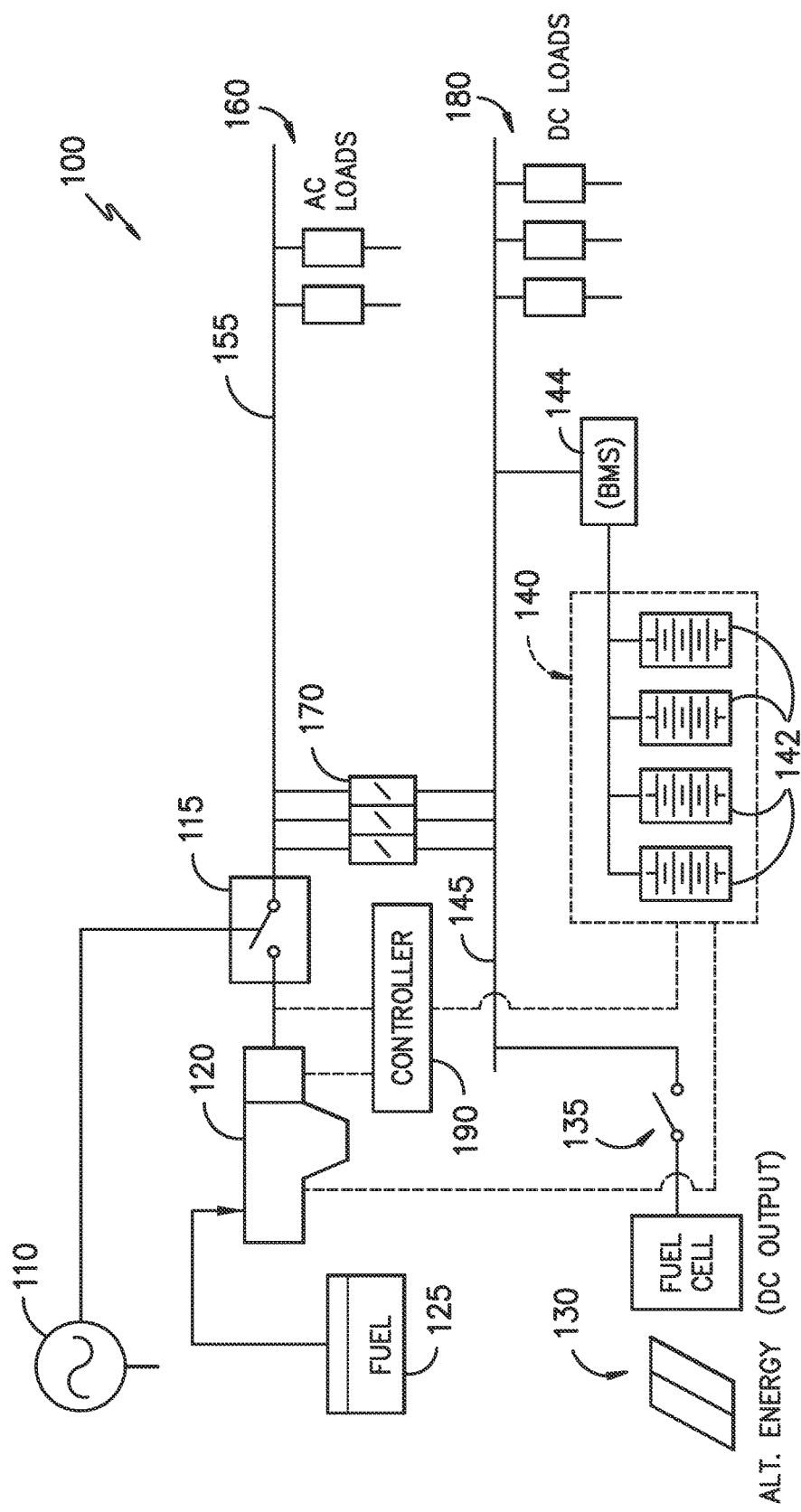
FIG. -1-

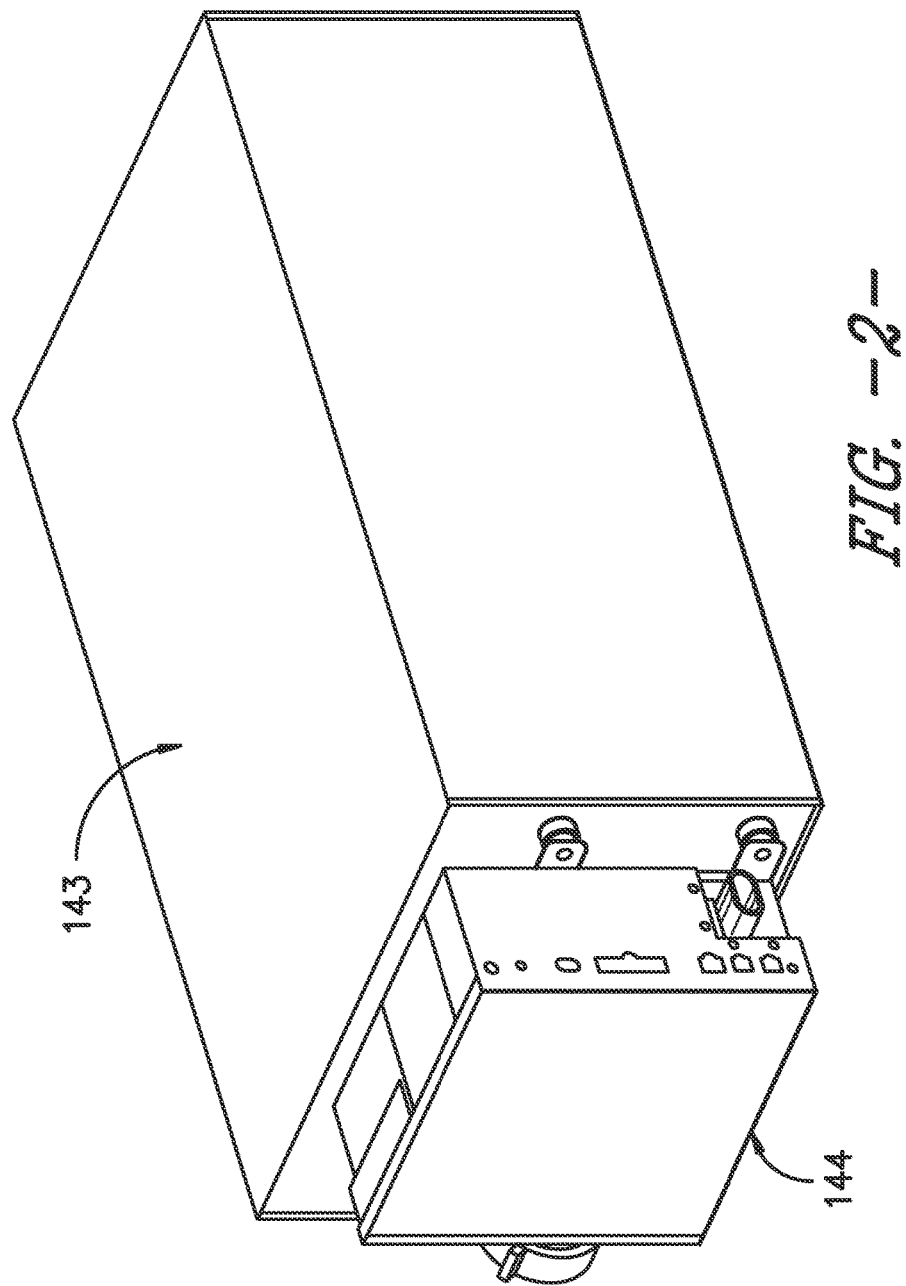

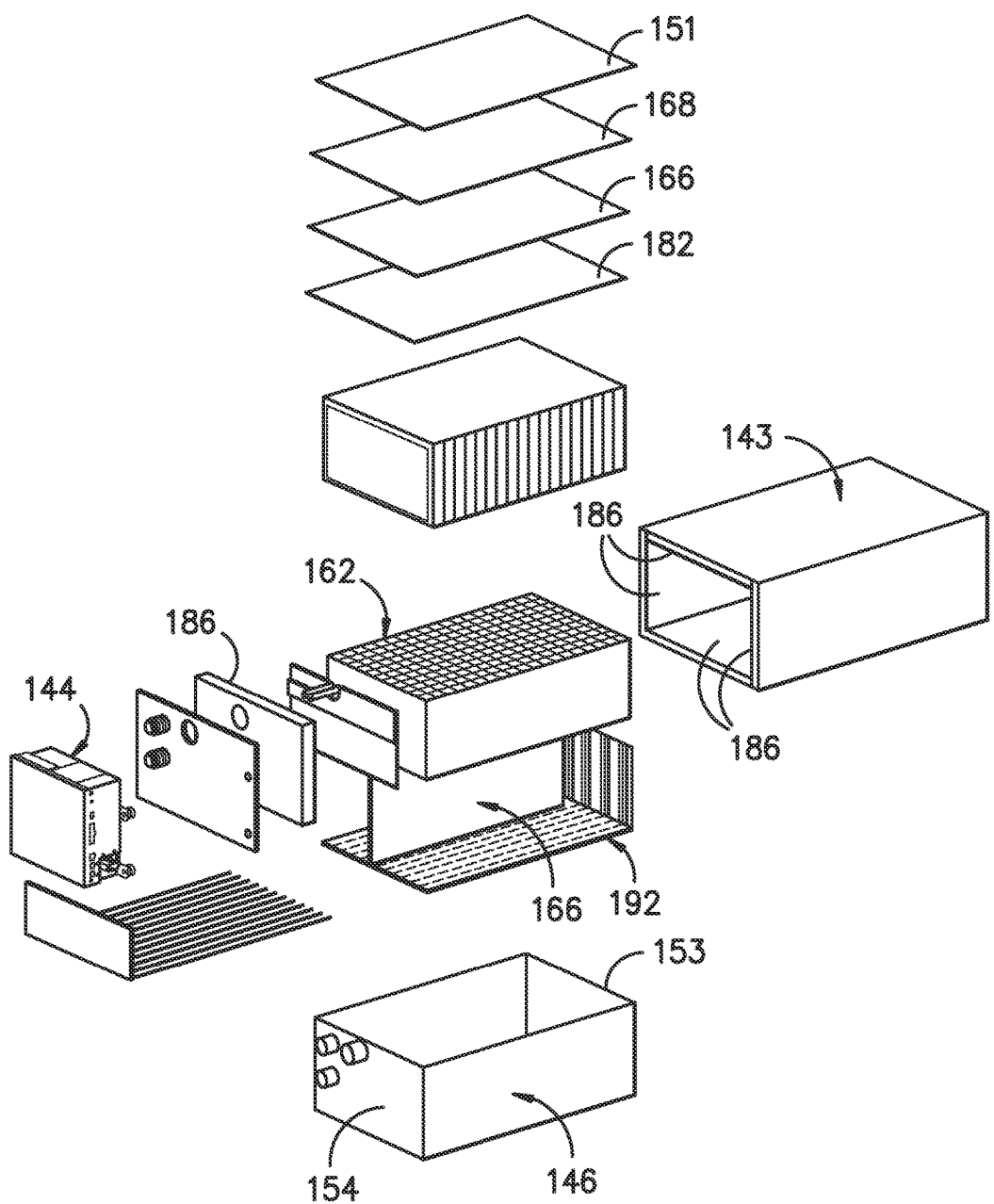
FIG. -3-

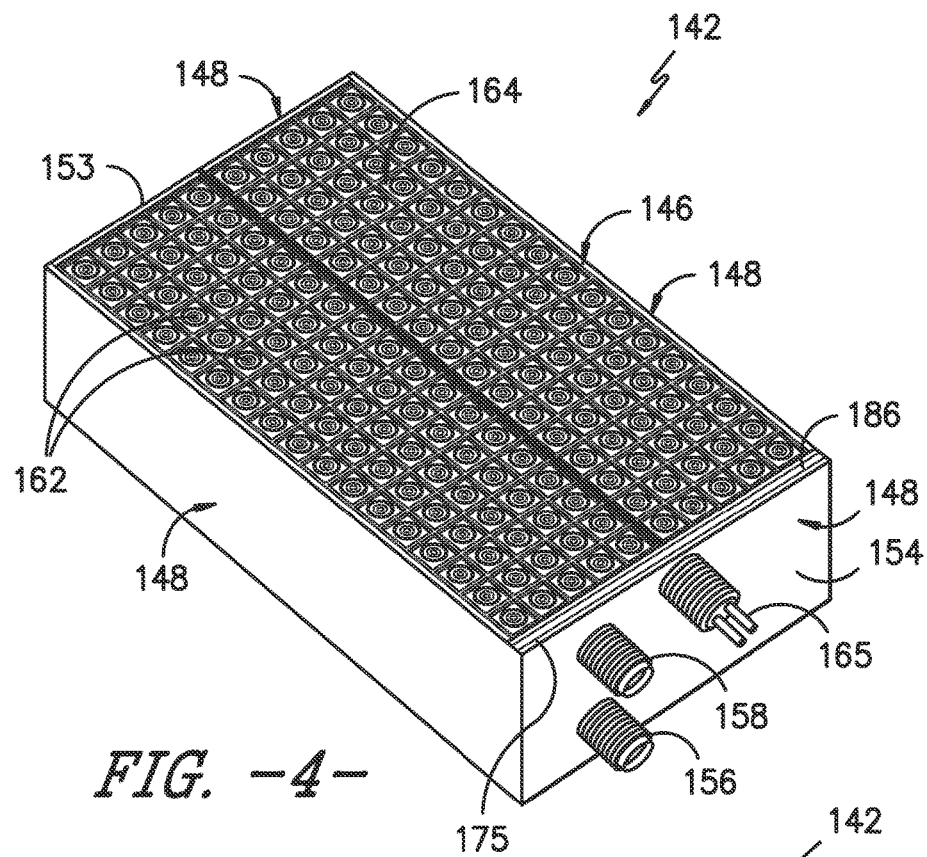
FIG. -4-
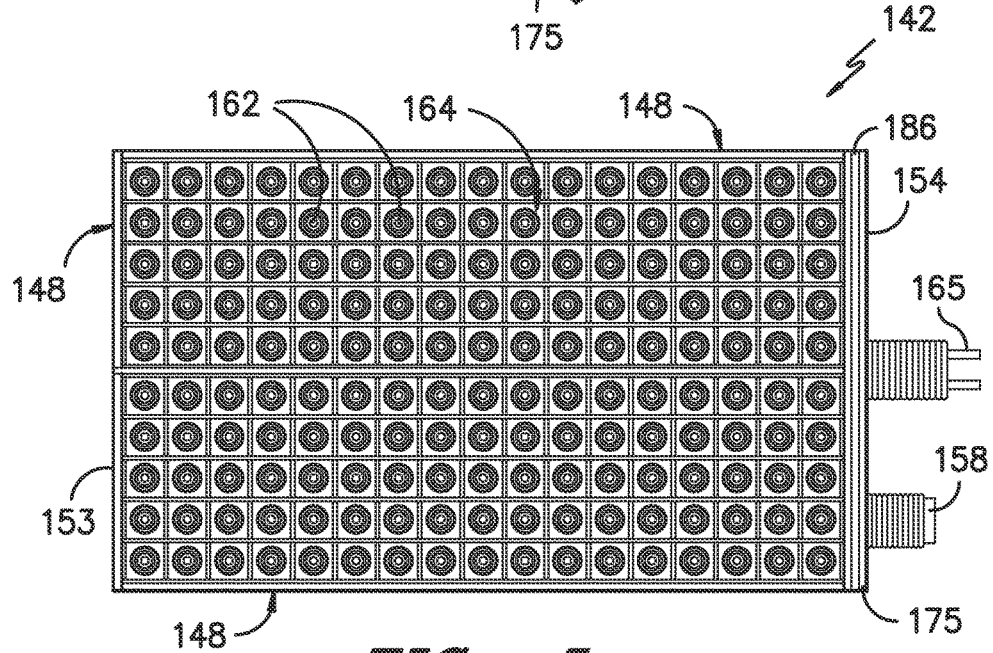
FIG. -5-

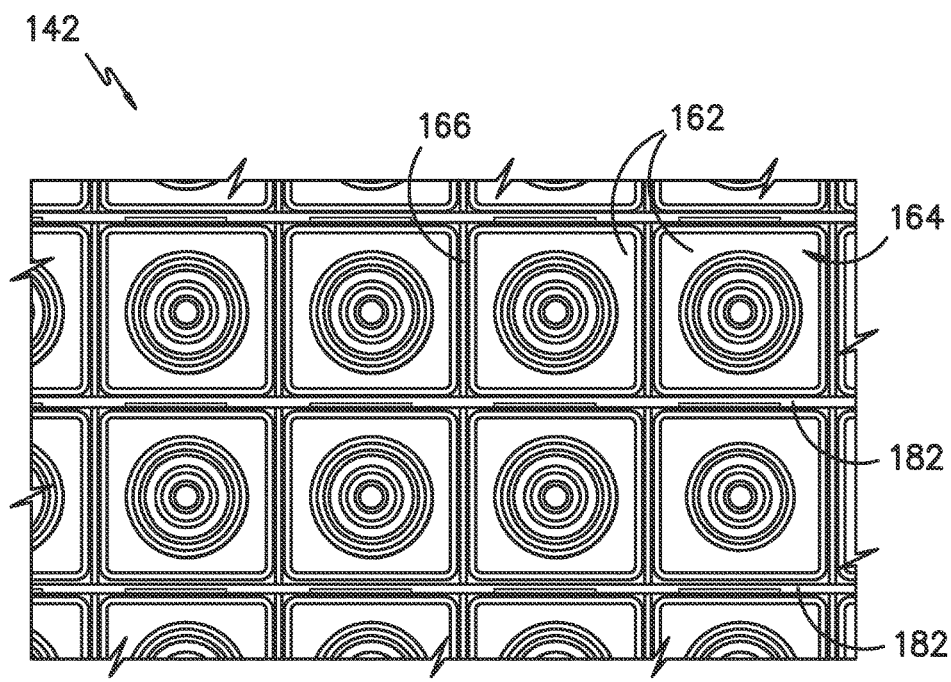
FIG. -6-
FIG. -7-
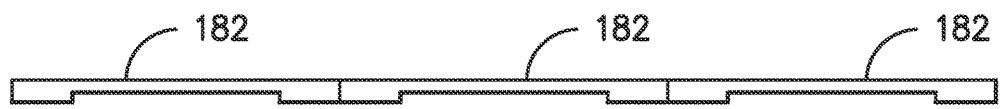
FIG. -8-

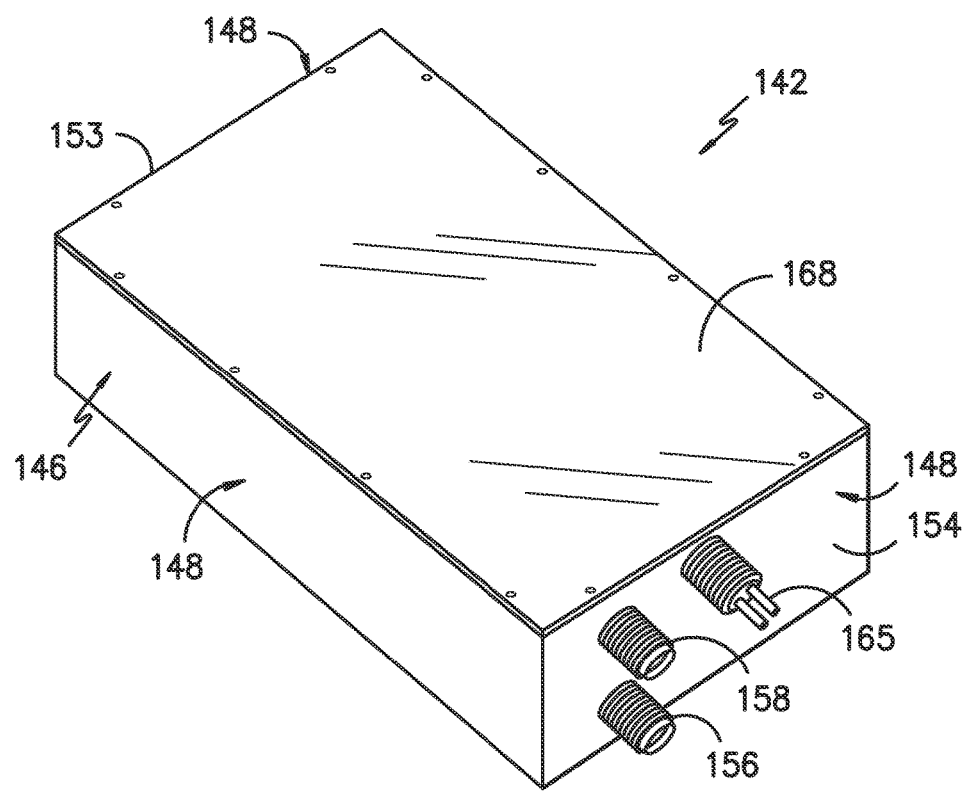
FIG. -9-

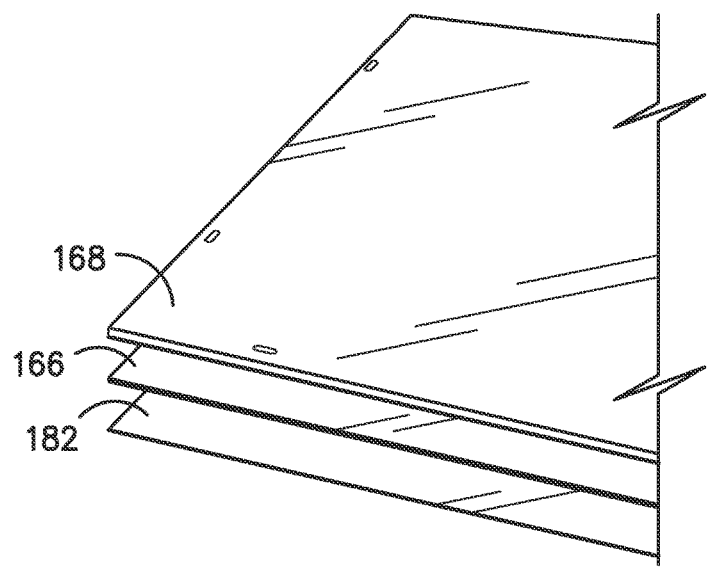
FIG. -10-
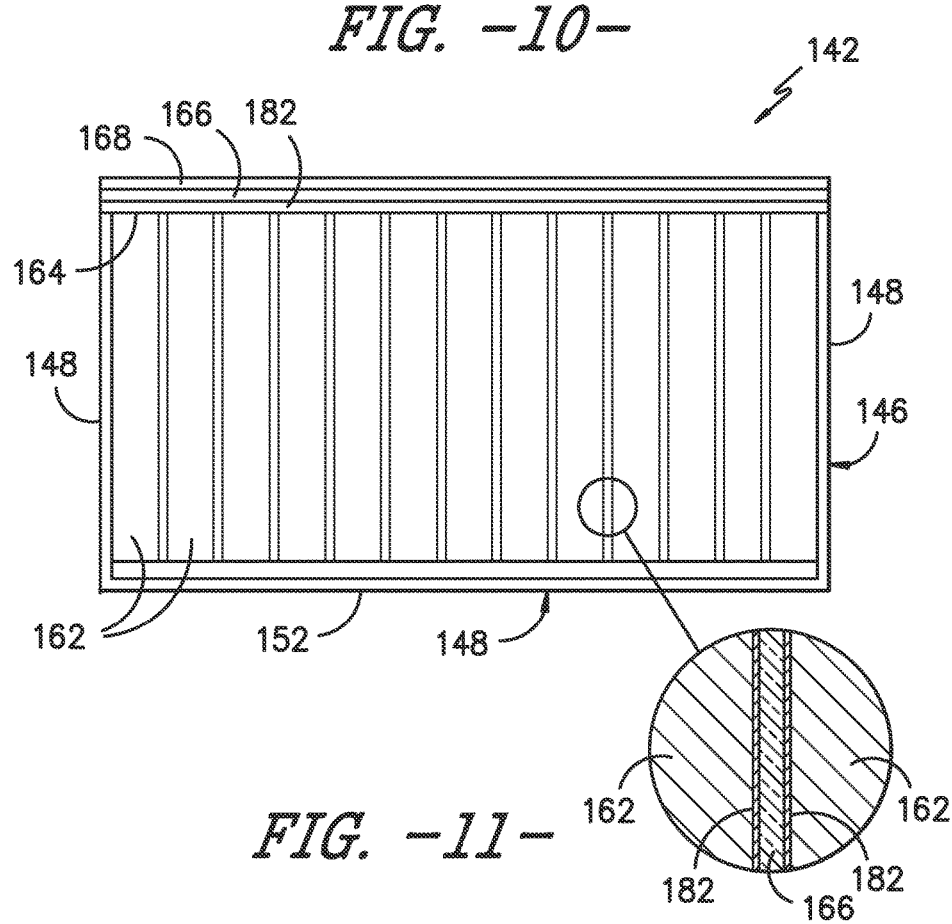
FIG. -11-

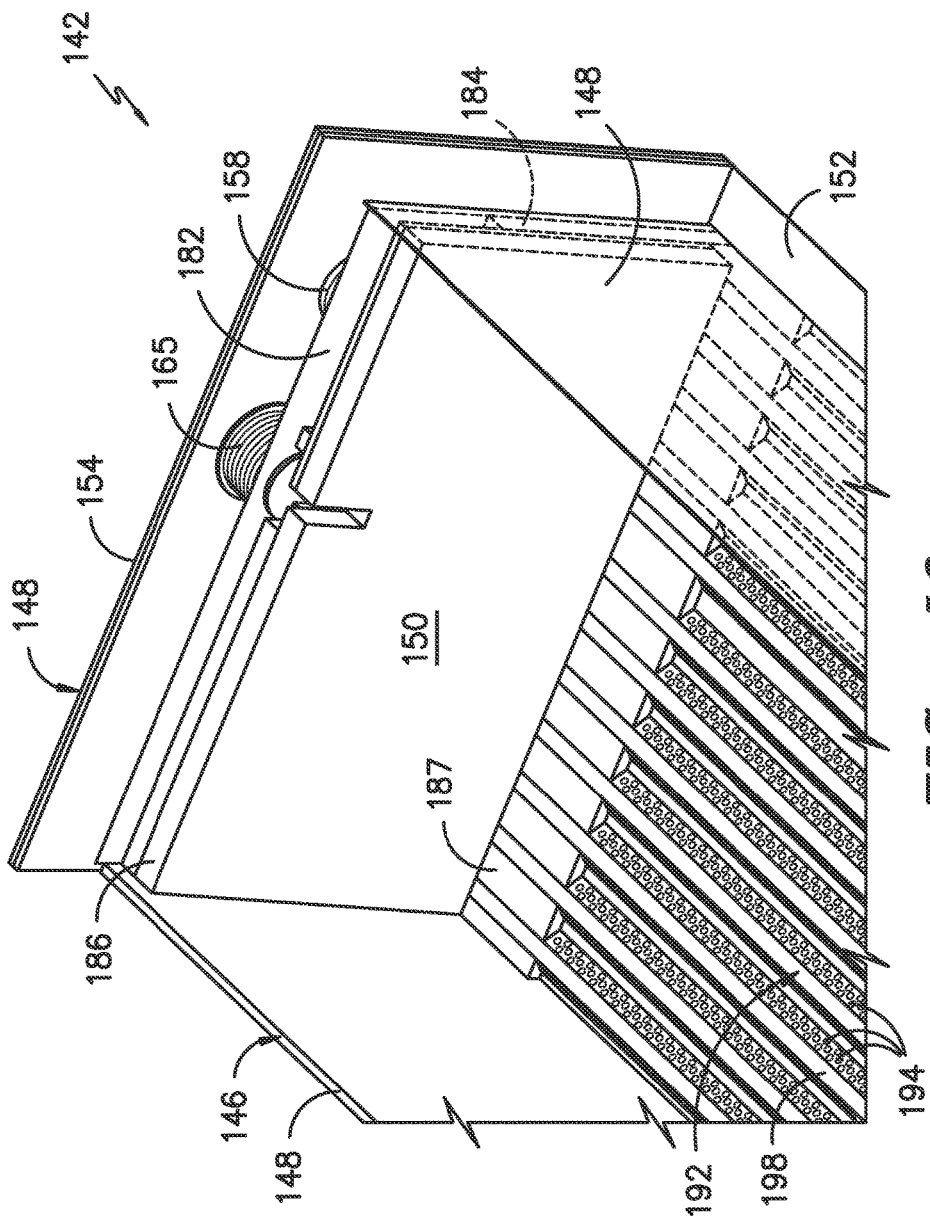
FIG. -12-

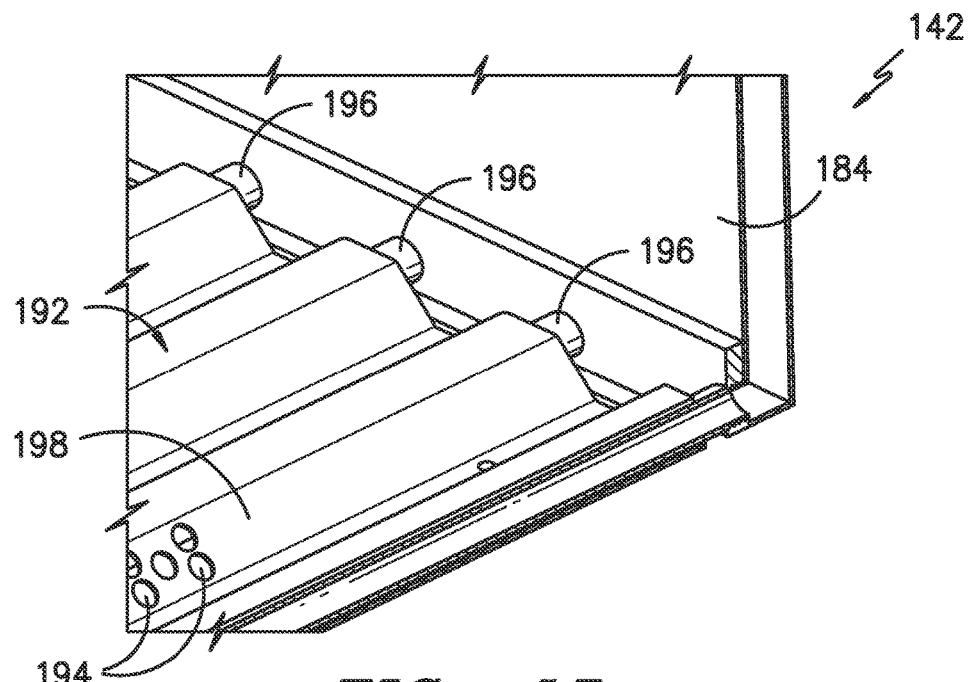
FIG. -13-
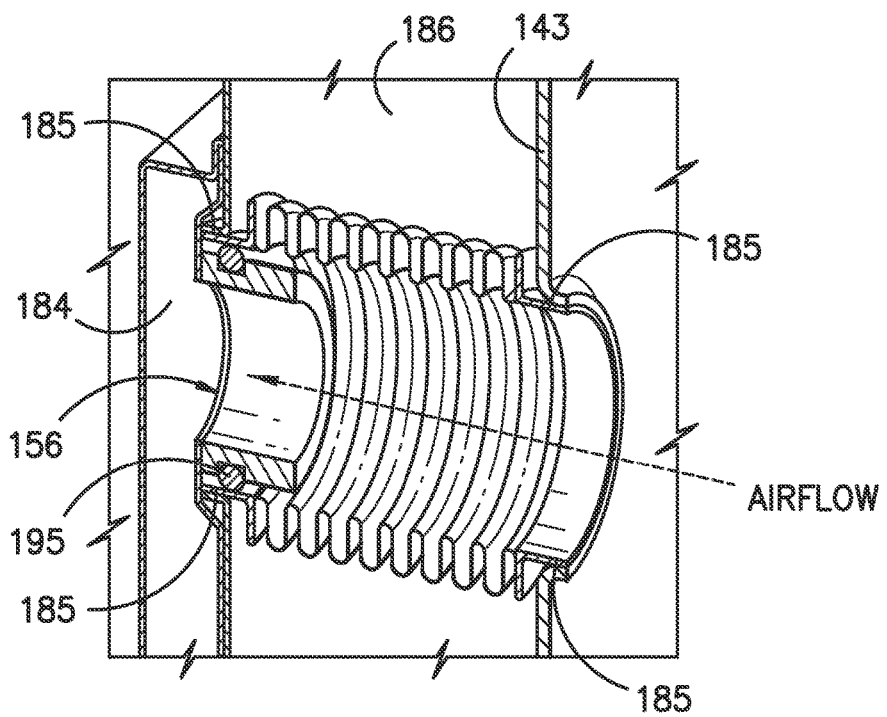
FIG. -14-

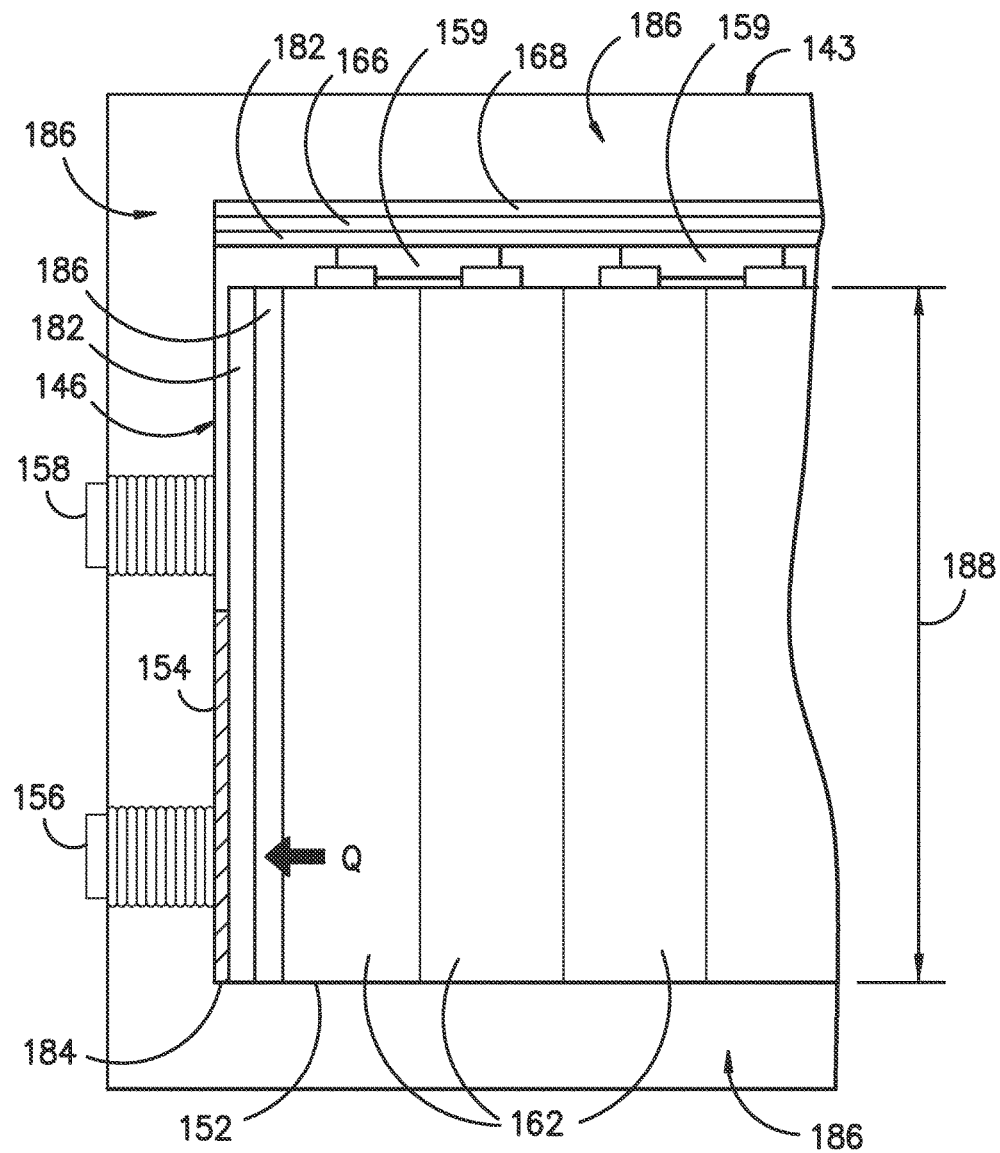
FIG. -15-

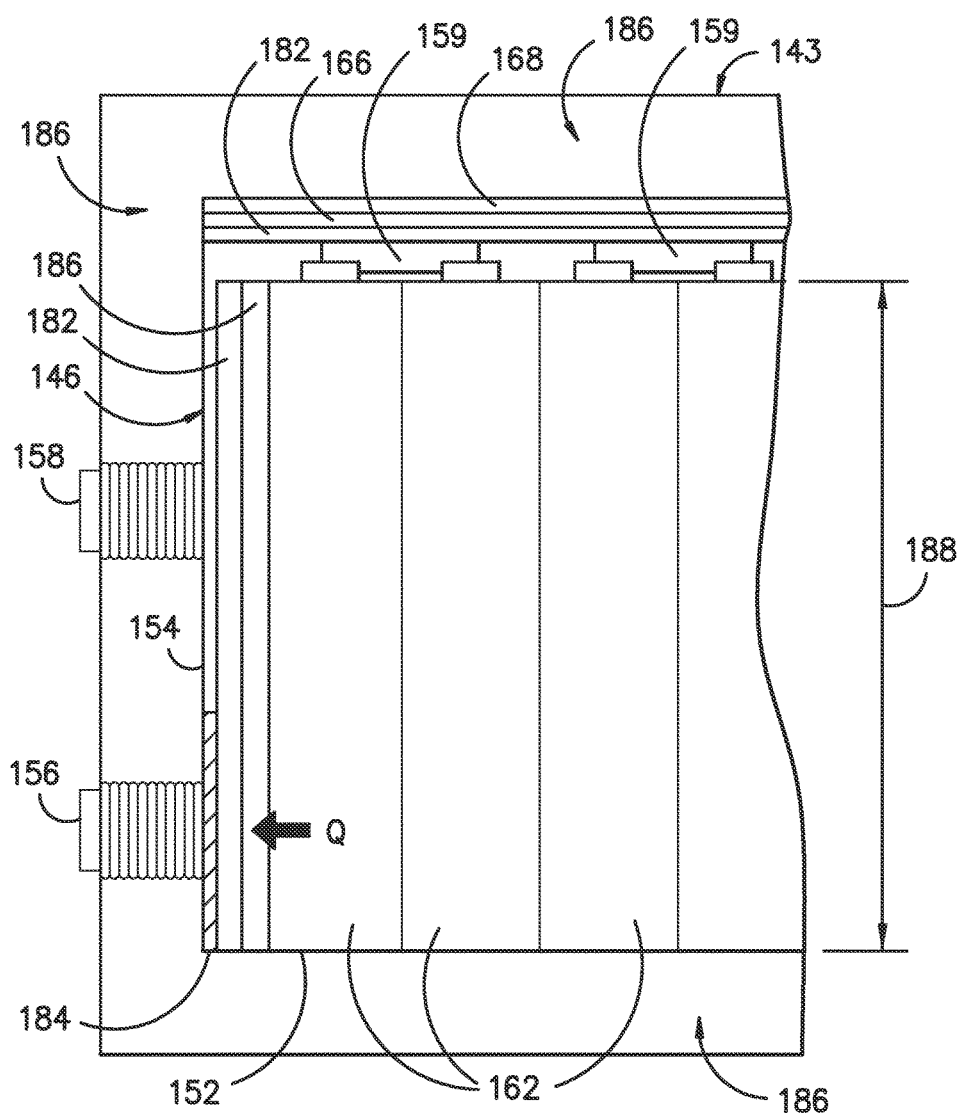
FIG. -16-

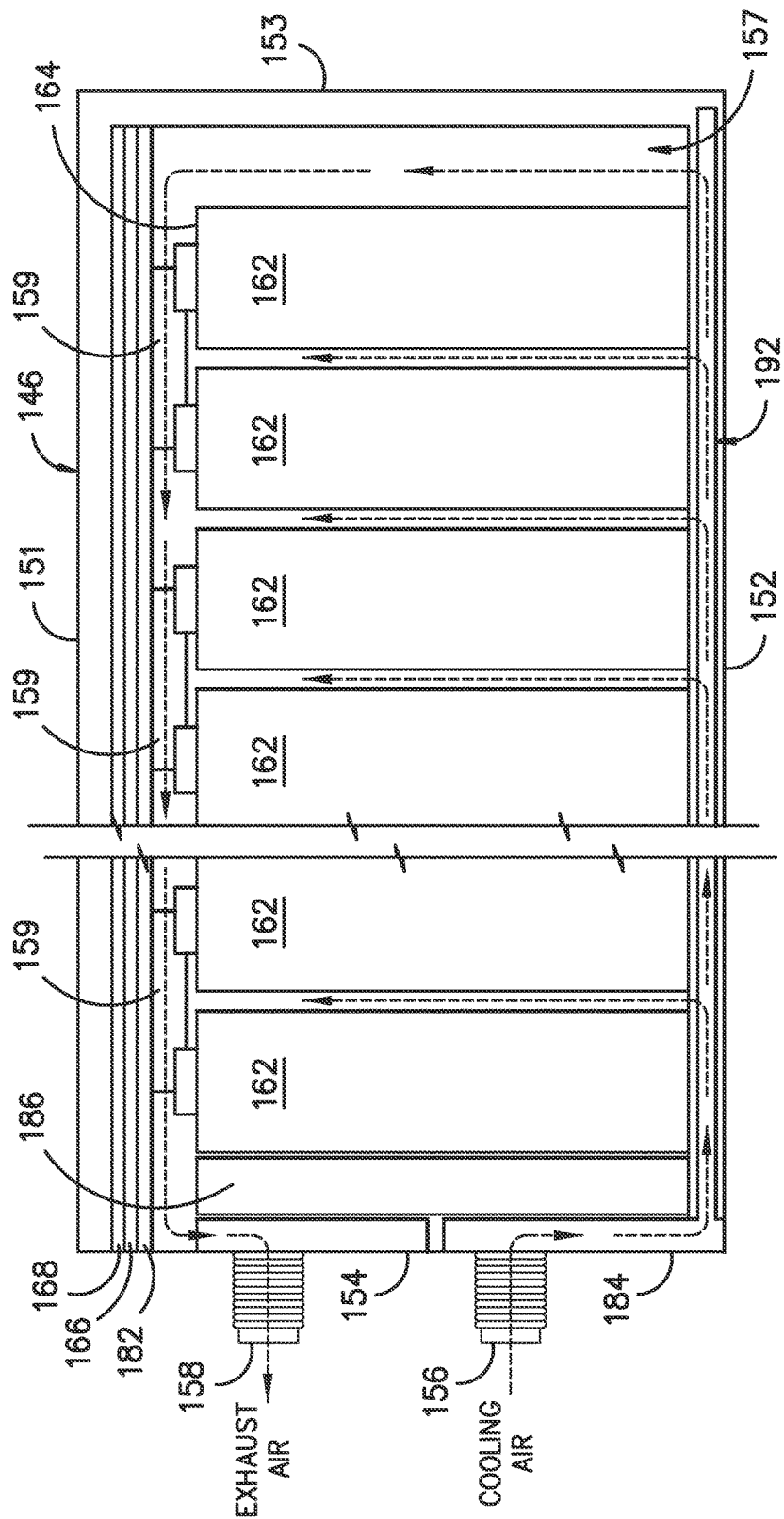
FIG. -17-

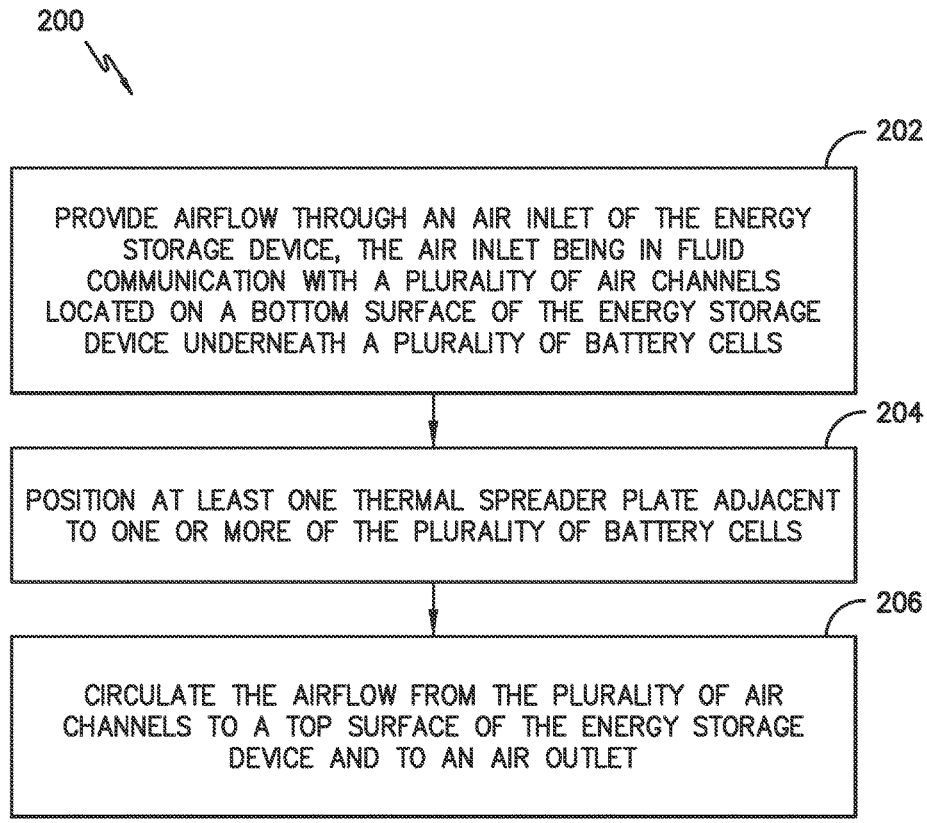
FIG. -18-

ENERGY STORAGE DEVICE WITH REDUCED TEMPERATURE VARIABILITY BETWEEN CELLS

FIELD OF THE INVENTION

The present disclosure relates generally to energy storage devices, and more particularly to an energy storage device having reduced temperature variability between cells inside the energy storage device.

BACKGROUND OF THE INVENTION

Typically, for an off-grid or weak-grid consuming entity, e.g. a telecom facility, the main power source may include a hybrid engine-generator/battery system that can be used in backup situations. For example, if power from the commercial utility is lost, the engine-generator set can be activated to supply power to the facility. Start-up of the engine-generator set, however, takes time; therefore, the battery can provide power during this transitional time period. If the engine-generator set fails to start (e.g., runs out of fuel, suffers a mechanical failure, etc.), then the battery is able to provide power for an additional period of time. In this way, electrical energy production does not have to be drastically scaled up and down to meet momentary consumption. Rather, production can be maintained at a more constant level. Thus, electrical power systems can be more efficiently and easily operated at constant production levels.

Other battery applications may include a grid-connected energy storage system and/or motive-based storage. For example, such grid-connected battery systems can be utilized for peak shaving for commercial/industrial plants, buffering peak loads in distribution grids, energy trading, buffering solar power for night time, upgrade of solar/wind power generation, and/or any other suitable application.

Such batteries typically include a plurality of cells housed within an inner housing. Each of the cells is a sub-system building block that contains electrochemical energy stored therein in its smallest, usable form. Thus, the cells are designed to maintain reactions in separate compartments (i.e., anode and cathode) with a working membrane between them (e.g., solid electrolyte). In addition, individual cells typically have limited charge capacity (e.g., 40 A-hr) and are limited to the electrochemistry voltage potential (e.g., typically from about 1.5 V to about 3.5 V). Thus, in order to create an electrical energy storage system with useful capacity and voltage, multiple cells are connected in series, parallel or combination thereof to form a battery. Typically, a collection of cells is generally referred to as a cell pack. Thus, within the cell pack, the cells may be connected in series, parallel, and/or combinations thereof to provide a useful amount of electrical energy capacity and voltage. Accordingly, the battery or energy storage device generally refers to the complete energy storage system, including the cell pack, bus conductors, electrical insulation, thermal insulation, temperature regulation-subsystem, electronic control sub-system, and/or external handling features.

In the battery applications described above, as well as any other suitable battery applications, it is important to maintain a uniform temperature between the cells inside the battery. For modern designs, the cooling hardware flows air underneath the cell pack and then over the top. However, since the airflow is not sealed, some of the air flows over the front cells, thereby causing the front cells to cool more than the remaining cells. When the cells get colder, their internal electrical resistances increase, which can drive a higher voltage across the cells during recharge at a fixed current flow. This higher voltage can then damage the cold cells, which can degrade the performance and/or reliability of the overall battery.

Thus, it would be advantageous to provide an improved energy storage system having reduced temperature variability between cells.

BRIEF DESCRIPTION OF THE INVENTION

Aspects and advantages of the invention will be set forth in part in the following description, or may be obvious from the description, or may be learned through practice of the invention.

One example aspect of the present disclosure is directed to an energy storage device having reduced temperature variability between cells. More specifically, in certain embodiments, the energy storage device includes an inner housing having one or more side walls that define an internal volume. The side walls include, at least, a bottom side wall and a front side wall having an air inlet and an air outlet. The energy storage device also includes a plurality of cells arranged in a matrix within the internal volume of the inner housing atop the bottom side wall. Further, the plurality of cells defines a top surface. The energy storage device also includes an airflow distribution network configured with the air inlet and the air outlet. In addition, the airflow distribution network is at least partially sealed from the plurality of cells (e.g. at the front side wall) so as to reduce temperature variability across the cells when external air is provided through the air inlet.

In one embodiment, the airflow distribution network is configured with the bottom side wall of the inner housing and extends from the front side wall of the inner housing to a rear side wall thereof. In another embodiment, the airflow distribution network may include a plurality airflow pipes covered with a sump plate. More specifically, in certain embodiments, the sump plate may include a plurality of perforations.

In another embodiment, the energy storage device may include at least one thermal spreader plate positioned at one or more locations within the internal volume, including but not limited to the top or bottom surfaces of the plurality of cells, the side surfaces of the plurality of cells, or between one or more of the plurality of cells. Thus, the thermal spreader plate(s) is configured to transfer heat across the cell pack so as to improve battery reliability.

In one embodiment, the energy storage device may also include a heater at least one electrical insulation plate positioned on the top surface of the plurality of cells. Thus, in such embodiments, the energy storage device may also include at least one thermal spreader plate may be positioned between the heater and the at least one electrical insulation plate.

In another embodiment, the energy storage device may also include a manifold configured between a front row of the cells and the front side wall of the inner housing of the energy storage device. More specifically, in certain embodiments, the manifold may have a height of about 50% of an overall height of the inner housing of the energy storage device or greater. Alternatively, in further embodiments, the manifold may have a height that is less than 50% of the overall height of the inner housing. More specifically, in particular embodiments, the height of the manifold may be from about 5% to about 40% of the overall height of the inner housing to reduce the unwanted conduction heat transfer from the cell pack to the manifold.

In additional embodiments, the energy storage device may also include one or more electrical insulation plates configured therein. More specifically, in certain embodiments, the electrical insulation plate(s) may be configured with the front side wall of the inner housing, between one or more of the cells, on the top surface of the plurality of cells, or any combinations thereof. In further embodiments, the electrical insulation plate(s) may be constructed, at least in part, of any suitable high-temperature electrical insulation material (e.g. mica) or any other suitable mineral material. In additional embodiments, the electrical insulation plate(s) may define an airflow channel, e.g. a U-shaped cross-section, so as to allow airflow to pass therethrough. In yet another embodiment, the thermal spreader plate(s) may be sandwiched between at least two electrical insulation plates and positioned between one or more of the cells.

In a further embodiment, the thermal spreader plate(s) may be constructed, at least in part, of at least one of a metal or metal alloy. More specifically, in certain embodiments, the metal or metal alloy may include at least one of copper, aluminum, steel, zinc, brass, iron, nickel, or similar, or any other high thermal conductivity material (e.g. graphene), or any combinations thereof. For example, in one embodiment, the thermal spreader plate(s) may be constructed of copper and may be nickel-plated, e.g. so as to protect the plate(s) against oxidation and/or corrosion.

In additional embodiments, the bottom side wall of the inner housing may further include an airflow distribution network extending from a rear side wall to the front side wall of the inner housing. More specifically, in certain embodiments, the airflow distribution network may include one or more airflow pipes covered by a sump plate. In addition, the sump plate may include a plurality of perforations and/or a corrugated profile defining channels for the one or more airflow pipes. For example, in one embodiment, the airflow distribution network may include cooling airflow pipes contained within perforated sump plate channels. Thus, the perforations are configured to allow cooling air to flow through the energy storage device with minimal pressure drop.

In still another embodiment, the energy storage device may also include one or more thermal insulation materials configured at one or more locations within the internal volume of the inner housing. For example, in certain embodiments, one or more strips of insulation materials may be configured atop at least a portion of the airflow distribution network, e.g. atop the sump plate, so as to insulate the airflow distribution network from cells that are adjacent to the front side wall of the inner housing. In another embodiment, one or more thermal insulation materials may be configured with the front side wall of the inner housing.

In yet another embodiment, the energy storage device may also include one or more seals, e.g. at the air inlet of the front side wall of the inner housing. As such, the seal(s) is configured to isolates the external air provided to the air inlet and the air distribution network. More specifically, in certain embodiments, the air inlet may include an annular seal.

In further embodiments, the energy storage device may include at least one of a sodium nickel chloride battery, a sodium sulfur battery, a lithium ion battery, a nickel metal hydride battery, or similar.

In another aspect, the present disclosure is directed to an energy storage device having reduced temperature variability between cells. More specifically, in certain embodiments, the energy storage device includes an inner housing having one or more side walls that define an internal volume. The side walls include, at least, a bottom side wall and a front side wall, with the front side wall having an air inlet and an air outlet. The energy storage device also includes a plurality of cells arranged in a matrix within the internal volume of the inner housing atop the bottom side wall. In addition, the energy storage device includes an airflow distribution network configured with the air inlet and the air outlet. Further, the airflow distribution is at least partially sealed from the plurality of cells so as to reduce temperature variability across the plurality of cells when external air is provided through the air inlet.

In yet another aspect, the present disclosure is directed to a method for reducing temperature variability between a plurality of cells in an energy storage device. The method includes providing airflow through an air inlet of the energy storage device. Further, the air inlet is in fluid communication with an airflow distribution network, e.g. located on a bottom side wall of the energy storage device underneath the plurality of cells. The method also includes sealing the airflow at the air inlet and within the plurality of airflow distribution network from the cells. Further, the method includes positioning at least one thermal spreader plate adjacent to one or more of the plurality of cells. In addition, the method includes circulating the airflow from the airflow distribution network to a top surface of the energy storage device and to an air outlet.

In one embodiment, the airflow distribution network may include a plurality airflow pipes covered with a sump plate. Further, the sump plate may include a plurality of perforations. Thus, in certain embodiments, the method may also include customizing at least one of a size or location of each of the plurality of perforations.

In another embodiment, the step of positioning the thermal spreader plate(s) adjacent to one or more of the cells may further include positioning the thermal spreader plate(s) atop the cells. In further embodiments, the step of positioning the thermal spreader plate(s) adjacent to one or more of the cells may also include positioning one or more thermal spreader plates between one or more of the cells.

In additional embodiments, the method may also include providing a heater atop the plurality of cells. Thus, in certain embodiments, the method may also include positioning one or more electrical insulation plates between the cells and/or between a top surface of the plurality of cells and the heater.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram of one embodiment of a hybrid power system utilizing one or more energy storage devices according to the present disclosure;

FIG. 2 illustrates a perspective view of one embodiment of an energy storage device having reduced temperature variability between cells according to the present disclosure;

FIG. 3 illustrates an exploded view of the energy storage device of FIG. 2;

FIG. 4 illustrates a perspective view of one embodiment of an inner housing of an energy storage device having reduced temperature variability between cells according to the present disclosure;

FIG. 5 illustrates a top view of the inner housing of the energy storage device of FIG. 4;

FIG. 6 illustrates a detailed view of the inner housing of the energy storage device of FIG. 5;

FIG. 7 illustrates a detailed cross-sectional view of one embodiment of an electrical insulation plate according to the present disclosure;

FIG. 8 illustrates a detailed cross-sectional view of another embodiment of an electrical insulation plate according to the present disclosure;

FIG. 9 illustrates a perspective view of another embodiment of an energy storage device having reduced temperature variability between cells according to the present disclosure, particularly illustrating a thermal spreader plate and a heater configured atop the cells;

FIG. 10 illustrates a perspective view of one embodiment of a thermal spreader plate configured between a mineral plate and a heater of the energy storage device according to the present disclosure;

FIG. 11 illustrates a cross-sectional view of the inner housing of the energy storage device of FIG. 4;

FIG. 12 illustrates a partial, internal perspective view of one embodiment of the inner housing of the energy storage device of the present disclosure, particularly illustrating the manifold configured at the front side wall of the inner housing atop the insulated airflow distribution network;

FIG. 13 illustrates a detailed, internal view of one embodiment of the energy storage device of the present disclosure, particularly illustrating the airflow distribution network of the inner housing;

FIG. 14 illustrates a perspective view of one embodiment of an air inlet welded between the inner and outer housings of the energy storage device according to the present disclosure, particularly illustrating an annular seal configured with the air inlet;

FIG. 15 illustrates a partial side view of the energy storage device at the front side wall according to the present disclosure, particularly illustrating a manifold having a standard height;

FIG. 16 illustrates a partial side view of the energy storage device at the front side wall according to the present disclosure, particularly illustrating a manifold having a reduced height;

FIG. 17 illustrates a side view of the energy storage device according to the present disclosure, particularly illustrating the airflow from the air inlet through a sealed airflow distribution network to a top surface of the cells; and FIG. 18 illustrates a flow diagram of one embodiment of a method for reducing temperature variability between cells of an energy storage device according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an energy storage device having reduced temperature variability between cells of a cell pack. Thus, the present disclosure can be utilized in any suitable battery application, including but not limited to a consuming entity, a grid-connected energy storage system, and/or motive-based storage. In various embodiments, the energy storage device includes an inner housing configured within an outer housing. The inner housing has one or more side walls that define an internal volume. The side walls include, at least, a bottom side wall and a front side wall, with the front side wall having an air inlet and an air outlet configured to circulate cooling air through the energy storage device. The energy storage device also includes a cell pack having a plurality of cells arranged in a matrix within the internal volume of the inner housing atop the bottom side wall. Further, the plurality of sodium nickel chloride cells defines a top surface. In addition, the energy storage device includes at least one thermal spreader plate positioned on the top surface of the cell pack and/or between the cells. Thus, the thermal spreader plate(s) is configured to reduce temperature variability between the cells. In addition, the energy storage device includes a sealed airflow distribution network that circulates airflow without cooling the cells so as to reduce temperature variability across the cells when external air is provided through the air inlet.

The present disclosure has many advantages not present in the prior art. For example, lowering the temperature gradient across the cell pack allows the cooling air blower to be run longer, which allows the pack to be cooled faster during recharge. Such faster recharge allows customers to get more energy throughput from the battery. In addition, cooling during discharge can provide longer run time for the battery by reducing the peak temperature. Further, a lower temperature also slows cell degradation and thus improves battery life.

Referring now to the drawings, FIG. 1 is an illustration of one embodiment of a hybrid power system 100, e.g. for a telecom base transceiver station (BTS), that can benefit from the energy storage device 142 of the present disclosure. In addition, it should be understood by those of ordinary skill in the art that the energy storage device 142 of the present disclosure can be used in any other suitable battery application, e.g. grid-connected energy storage, utility back-up power, motive-based storage, and/or similar, and the embodiment of FIG. 1 is provided for illustrative purposes only. As shown, FIG. 1 depicts multiple sources of power including an AC power grid 110, an engine-generator power source or engine-generator set (EGS) 120, alternative energy source 130, and a battery power source 140, which, as shown, includes a plurality of energy storage devices 142. A transfer switch 115 allows transfer of operation between the AC power grid 110 and the EGS 120, as well as other AC electrical power that may be available. The EGS 120 typically runs on fuel (e.g., diesel fuel) provided by a fuel source 125 (e.g., a storage tank). An availability switch 135 allows for alternate energy sources 130 (e.g. solar, wind, or fuel cell), if available, to be switched in to a DC bus 145 or an AC bus 155 of the power system 100 as well. If switching into the AC bus 155, an inverter 170 (described below) can be coupled between the alternate energy source 130 and the AC bus 155.

The battery power source 140 is an electrical power source. More specifically, in certain embodiments, the battery power source 140 may include one or more energy storage devices, e.g. battery modules 142. Such battery modules 142 may contain any suitable batteries known in the art. For example, in various embodiments, the battery modules 142 may contain one or more sodium nickel chloride batteries, sodium sulfur batteries, lithium ion batteries, nickel metal hydride batteries, fuel cells, or similar. More specifically, in certain embodiments, the battery modules 142 may include a plurality of sodium nickel chloride cells 162 arranged in a matrix, e.g. in a plurality of rows and columns. In addition, in particular embodiments, each of the cells 162 may include a ceramic electrolyte material that separates the electrodes of adjacent cells. Thus, during charging, chloride ions may be released from sodium chloride and combined with nickel to form nickel chloride. The sodium ions that remain can move through the electrolyte into a reservoir. When the battery produces power, the ions move back through the electrode and the reaction is reversed. The process typically occurs at about 300 degrees Celsius (° C.) inside an insulated container or inner housing 146 (FIGS. 3-5). Sodium nickel chloride batteries are particularly suitable due to their short charge times that can drive the EGS 120 to peak efficiency, thereby reducing fuel costs for the BTS. In addition, sodium nickel chloride battery performance is not affected by ambient temperature; therefore, such batteries can be used at sites with extreme temperature variations. Further, the battery modules 142 are typically available in three size ranges, namely kWh, MWh and GWh.

Referring still to FIG. 1, the AC bus 155 provides AC power to drive AC loads 160 of the system such as, for example, lighting and/or air conditioning of a telecom base transceiver station (BTS). Furthermore, the AC bus 155 can provide AC power to a bi-directional inverter 170 which converts AC power to DC power which provides DC power to the DC bus 145 to drive DC loads 180 of the power system 100. Example DC loads of the power system 100 include radios, switches, and amplifiers of the BTS. The DC bus 145 also provides DC power from the inverter 170 to charge the battery power source 140 and provides DC power from the battery power source 140 to the DC loads 180 as the battery power source 140 discharges. The inverter 170 may regulate DC power from a DC electrical power source (e.g., a solar energy system or a fuel cell energy system) instead of an AC electrical power source. In general, a primary power source may provide AC or DC electrical power that is used by an energy storage device (e.g., by the DC battery power source 140) of the power system 100.

During operation of the hybrid power system 100, when the EGS 120 is on, the EGS 120 is configured to provide power to the DC loads 180 and to the battery power source 140 during a charging part of the cycle. When the EGS 120 is off, the battery power source 140 is configured to provide power to the DC loads 180 during a discharging part of the cycle. Further, the battery power source 140 may be controlled by a battery management system (BMS) 144. As used herein, the BMS 144 generally refers to any electronic system that manages a rechargeable battery module (e.g. cell or battery pack), such as by protecting the battery module from operating outside a safe operating mode, monitoring a state of the battery module, calculating and reporting operating data for the battery module, controlling the battery module environment, and/or any other suitable control actions. For example, in several embodiments, the BMS 144 is configured to monitor and/or control operation of one or more energy storage devices (e.g. the battery modules 142). Further, the BMS 144 may be configured to communicate with the EGS 120 by sending a start-up command so as to start-up the engine of the EGS 120 in accordance with control logic of the BMS 144. In addition, the BMS 144 may be, for example, a logic controller implemented purely in hardware, a firmware-programmable digital signal processor, or a programmable processor-based software-controlled computer.

The power system 100 may also include a controller 190 that is configured to monitor and/or control various aspects of the power system 100 as shown in FIGS. 1 and 2. For example, the controller 190 may be configured to command the engine of the EGS 120 to turn on or off in accordance with control logic of the controller 190. In accordance with various embodiments, the controller 190 may be a separate unit (as shown) or may be part of the BMS 144 of the battery power source 140.

Referring now to FIGS. 2-15, various views of an energy storage device 142 having reduced temperature variability between cells according to the present disclosure is illustrated. As shown particularly in FIGS. 2 and 3, the energy storage device 142 includes an inner housing 146 contained within an outer housing 143. The inner housing 146 has one or more side walls 148 that define an internal volume 150 thereof. More specifically, as shown particularly in FIGS. 3-5 and 9 and 11, the side walls 148 include, at least, a top side wall 151, a bottom side wall 152, a rear side wall 153, a front side wall 154, and opposing side walls (i.e. right and left side walls), with the front side wall 154 being configured with an air inlet 156 and an air outlet 158. More specifically, as shown in 4, 5, 9, and 14-17, the air inlet and outlets 156, 158 may include a bellow configuration. In addition, as shown in FIGS. 4-6 and 11, the energy storage device 142 also includes a plurality of cells 162 (e.g. sodium nickel chloride cells) arranged in a matrix within the internal volume 150 of the inner housing 146, e.g. atop the bottom side wall 152 of the inner housing 146. Further, as shown, the cells 162 define a top surface 164. In certain embodiments, as shown in FIGS. 14-16, the air inlet 156 (as well as the air outlet 158) may be welded between the inner and outer housings 143, 146. In addition, as shown in FIG. 14, the air inlet 156 may be further provided with one or more annular seals 195 configured to seal off cooling air entering the air inlet 156 from the cells 162 during operation. In addition, as shown, the air inlet 156 may be welded in place via one or more airtight welds 185. Further, the front side wall 154 of the inner housing 146 may include an electrical connector 165 configured to electrically couple the energy storage device 142 to the BMS 144 as described herein.

In additional embodiments, as shown in FIGS. 12-13, the bottom side wall 152 of the inner housing 146 may also include an airflow distribution network 192 extending longitudinally from a rear side wall 153 to the front side wall 154 of the inner housing 146. More specifically, as shown, the airflow distribution network 192 may include one or more airflow pipes 196 covered by a sump plate 198. In addition, the sump plate 198 may include a plurality of perforations 194 and/or a corrugated profile defining channels for the one or more airflow pipes 196. For example, in one embodiment, the airflow distribution network 192 may include cooling airflow pipes 196 contained within perforated sump plate channels. More specifically, in one embodiment, as shown, the sump plate 198 may be configured atop the plurality of airflow pipes 196. Alternatively, the sump plate 198 may have an alternating configuration with every other airflow pipe configured atop the sump plate 198 and alternating airflow pipes configured underneath the sump plate 198. In addition, the pattern of the perforations 194 may be customized such that more air is released in the center of the cell pack and/or the rear side wall 153, e.g., where more cooling air is needed. Thus, the perforations 194 are configured to allow cooling air to flow through the energy storage device with minimal pressure drop.

In addition, as shown in FIGS. 3-5, 12, and 14-17, the energy storage device 142 may also include one or more insulation materials 186, 187. For example, as shown particularly in FIG. 12, one or more strips of the insulation material 187 may be configured atop at least a portion of the airflow distribution network 192 (e.g. atop the sump plate 198 and within the channels of the corrugated profile) so as to insulate the airflow distribution network 192 from cells 192 adjacent to the front side wall 154 of the inner housing 146. Such insulation materials 187 serve to block airflow from flowing down the sump channels. In other words, the insulation materials 187 assist in forcing the cooling air to flow between the cells 162. In addition, as shown in FIG. 3, thermal insulation may be provided between each side wall 148 of the inner housing 146 and the outer housing 143. Further, as shown, in FIGS. 4, 5, and 14-17, one or more sheets of insulation material 186 may be configured between the plurality of cells 162 and the front side wall 154 of the inner housing 146.

Referring generally to FIGS. 3-6 and 10-11, the energy storage device 142 also includes at least one thermal spreader plate 166 configured to reduce temperature variability between the cells 162. More specifically, as shown in FIGS. 3, 9-11 and 15-16, at least one thermal spreader plate 166 may be positioned on the top surface 164 of the plurality of cells 162. For example, as shown, the energy storage device 142 may also include at least heater 168, e.g. positioned atop the cells 162 on the top surface 164. Thus, in such embodiments, one or more thermal spreader plates 166 may be positioned between the top surface 164 of the cells 164 and the heater 168. Alternatively, as shown particular in FIGS. 4-6 and 11, the thermal spreader plate(s) 166 may be positioned between the cells 162.

The thermal spreader plate(s) 166 as described herein may be constructed of any suitable material that provides reduced temperature variability between the cells 162 of the energy storage device 142. More specifically, in certain embodiments, the thermal spreader plate(s) 166 may be constructed, at least in part, of at least one of a metal or metal alloy. For example, in particular embodiments, the metal or metal alloy may include at least one of copper, aluminum, steel, zinc, brass, iron, nickel, or similar, or any other high thermal conductivity material (e.g. graphene), or any combinations thereof. In a particular embodiment, for example, the spreader plate(s) 166 may be constructed of copper and nickel-plated. Further, the thermal spreader plate(s) 166 may have any suitable thickness. For example, in certain embodiments, the thickness of the thermal spreader plate(s) 166 may range from about 0.5 millimeters (mm) to about 2 mm.

In addition, the energy storage device 142 may also include one or more electrical insulation plates 182 configured therein. For example, as shown in FIGS. 4 and 5, one or more electrical insulation plates 182 may be configured with the front side wall 154 of the inner housing 146. In further embodiments, one or more electrical insulation plates 182 may be configured between one or more of the cells 162. More specifically, in such an embodiment, the thermal spreader plate(s) 166 may be sandwiched between at least two electrical insulation plates 182 and positioned between one or more of the cells 162. Further, as shown in FIGS. 9-11 and 15-16, one or more electrical insulation plates 182 may be configured on the top surface 164 of the cells 162, e.g. below the thermal spreader plate 166. In addition, as shown in FIGS. 15-17, the stacked configuration include the electrical insulation plate 182, the thermal spreader plate 166, and the heater 168 may be supported atop the cells 162 via one or more electrical interconnects 159. Thus, the electrical interconnects 159 are configured to create an air passageway, e.g. between the top surface of the cells and the electrical insulation plate 182, which allows the exhaust air to flow to the front of the energy storage device 142. Moreover, it should be understood that the electrical insulation plate(s) 182 may be included in any other suitable location within the energy storage device 142 or any combinations thereof. Further, in certain embodiments, the electrical insulation plate(s) 182 may be constructed, at least in part, of any suitable high-temperature electrical insulation material (e.g. mica) or any other suitable electrical insulation plates. In addition, the electrical insulation plates 182 may have any suitable cross-sectional shape. For example, as shown in FIGS. 7 and 8, the electrical insulation plates 182 may have a channeled or corrugated profile. More specifically, as shown, the electrical insulation plates 182 may have a U-shaped profile. Alternatively, the electrical insulation plates 182 may have a substantially flat profile, e.g. similar to a sheet material. In addition, as shown, the electrical insulation plates 182 may be configured as a continuous plate (FIG. 7) or a segmented plate (FIG. 8).

Referring now to FIGS. 12-17, the energy storage device 142 may also include a manifold 184 configured between the front row of cells 162 and the front side wall 154 of the inner housing 146 to further assist with providing thermal insulation to the cells 162. In certain embodiments, as shown in FIG. 15, the manifold 184 may have a standard height, for example, of about 50% of an overall height of the inner housing 146 or greater. Alternatively, as shown in FIG. 16, the manifold 184 may have a reduced height that is less than 50% of the overall height of the inner housing 146 so as to reduce the amount of heat that is extracted from the front cells. In such an embodiment, the height of the manifold 184 may be from about 5% to about 40% of the overall height 188 of the inner housing 146. In addition, the manifold 184 may be configured with the airflow distribution network 192 such that incoming cooling air is sealed away from the cells 162.

During battery float, the battery cell temperature should be maintained at a predetermined temperature (e.g. at about 280 degrees Celsius (° C.)). During discharge and recharge of the energy storage device 142, the cells 162 need to be cooled using external air. Thus, airflow can be provided via the air inlet 156 to cool the manifold 184 which absorbs heat from the cells 162. More specifically, as shown in FIG. 18, a flow diagram of a method 200 for reducing temperature variability between a plurality of sodium nickel chloride cells 162 in an energy storage device 142 is illustrated. As shown at 202, the method 200 includes providing airflow through the air inlet 156 of the energy storage device 142. Further, as shown in FIG. 17, the air inlet 156 is in fluid communication with the airflow distribution network 192 located on the bottom side wall 152 of the energy storage device 142 underneath the plurality of cells 162. Further, in certain embodiments, the airflow may be at least partially sealed (e.g. using welds, seals 195, rolled edges, etc.) from the cells 162 so as to reduce temperature variability between the cells 162. More specifically, as shown, the airflow may enter the air inlet 156 and circulate through the airflow distribution network 192/air pipes 196 that are provided underneath the cells 162. For example, as shown in FIGS. 12, 13, and 17, the airflow may enter the airflow distribution network 192 and may exit the perforations 194 in the air pipes. Further, the airflow may flow through the cells 162 using the channeled mineral plates 182 (e.g. FIGS. 7 and 8) and/or the rear air flow channel 157. Thus, the airflow evenly cools the cells 162 as it circulates to the rear side wall 153 (FIGS. 4 and 17) without further cooling the manifold 184 (which causes the front cells 162 to be cooled more than desired). In addition, as shown at 204, the method 200 includes positioning at least one thermal spreader plate 166 adjacent to one or more of the plurality of cells 162. The thermal spreader plate(s) 166 (as well as the optional insulation materials 186) within the energy storage device 142 help reduce temperature variability within the cells 162 as the airflow circulates through the housing 146. As shown at 206, the method 200 includes circulating the airflow from the airflow distribution network 192 to the top surface 164 of the energy storage device 142 and to an air outlet 158. Thus, the present disclosure provides an energy storage device 142 with cells 162 that can be uniformly cooled during operation.

In another embodiment, the step of positioning the thermal spreader plate(s) 166 adjacent to one or more of the cells 162 may further include positioning the thermal spreader plate(s) 166 on the top surface 164 of the cells 162. In further embodiments, the step of positioning the thermal spreader plate(s) 166 adjacent to one or more of the cells 162 may also include positioning one or more thermal spreader plates 166 between one or more of the cells 162.

In additional embodiments, the method 200 may also include providing a heater 168 atop the plurality of cells 162. Thus, in certain embodiments, the method 200 may also include positioning one or more electrical insulation plates 182 between the cells 162 and/or between the top surface 164 of the cells 162 and the heater 182.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy storage device, comprising:
  a housing comprising a plurality of side walls that define an internal volume, the plurality of side walls comprising, at least, a bottom side wall and a front side wall, the front side wall comprising an air inlet and an air outlet;
  a plurality of energy storage cells arranged in a matrix within the internal volume atop the bottom side wall and defining a top surface;
  a heater positioned on the top surface of the plurality of energy storage cells,
  at least one electrical insulation plate positioned on the top surface of the plurality of energy storage cells,
  a thermal spreader plate positioned between the heater and the at least one electrical insulation plate so as to transfer heat across the plurality of energy storage cells; and,
  an airflow distribution network configured with the air inlet and the air outlet, the airflow distribution network being at least partially sealed from the plurality of energy storage cells so as to reduce temperature variability across the energy storage cells when external air is provided through the air inlet.

2. The energy storage device of claim 1, wherein the airflow distribution network is configured with the bottom side wall of the housing and extends from the front side wall of the housing to a rear side wall thereof.

3. The energy storage device of claim 2, wherein the airflow distribution network comprises a plurality airflow pipes covered with a sump plate, wherein the sump plate comprises a plurality of perforations.

4. The energy storage device of claim 1, further comprising at least one additional thermal spreader plate positioned between the plurality of energy storage cells.

5. The energy storage device of claim 1, further comprising a manifold configured between a front row of energy storage cells and the front side wall of the housing.

6. The energy storage device of claim 5, wherein the manifold comprises a height that is from about 5% to about 40% of an overall height of the housing.

7. The energy storage device of claim 4, further comprising at least one additional electrical insulation plates positioned at one or more locations within the internal volume, the one or more locations comprising at least one of the front side wall of the housing, between one or more of the energy storage cells, or any combinations thereof.

8. The energy storage device of claim 7, wherein the at least one additional thermal spreader plate is sandwiched between at least two additional electrical insulation plates between the plurality of energy storage cells.

9. The energy storage device of claim 1, wherein the at least one thermal spreader plate is constructed, at least in part, of at least one of a metal, a metal alloy, or an organic material, wherein the metal, the metal alloy, or the organic material comprises at least one of copper, aluminum, steel, zinc, brass, iron, graphene, or nickel.

10. The energy storage device of claim 1, wherein the at least one electrical insulation plate defines an airflow channel, the at least one electrical insulation plate being constructed, at least in part, of mica.

11. The energy storage device of claim 10, further comprising one or more thermal insulation materials configured at one or more locations within the internal volume of the housing, the one or more locations comprising at least one of atop at least a portion of the airflow distribution network or with the front side wall of the housing, wherein the one or more insulation materials are configured to insulate the airflow distribution network from energy storage cells adjacent to the front side wall.

12. The energy storage device of claim 11, further comprising an annular seal at the air inlet of the front side wall, wherein the annular seal isolates the external air provided to the air inlet and the air distribution network.

13. A method for reducing temperature variability between a plurality of energy storage cells in an energy storage device, the method comprising:
  providing airflow through an air inlet of the energy storage device, the air inlet being in fluid communication with an airflow distribution network located on a bottom side wall of the energy storage device underneath the plurality of energy storage cells;

sealing the airflow at the air inlet and within the airflow distribution network from the energy storage cells;

positioning a heater and at least one electrical insulation plate on a top surface of the plurality of energy storage cells;

positioning at least one thermal spreader plate between the heater and the electrical insulation plate; and, circulating the airflow from the airflow distribution network to the top surface of the energy storage device and to an air outlet.

14. The method of claim 13, wherein the airflow distribution network comprises a plurality airflow pipes covered with a sump plate, wherein the sump plate comprises a plurality of perforations, the method further comprising customizing at least one of a size or location of each of the plurality of perforations.

15. The method of claim 13, further comprising positioning one or more additional thermal spreader plates between one or more of the plurality of energy storage cells.

16. The method of claim 13, further comprising positioning one or more additional electrical insulation plates between one or more of the plurality of energy storage cells.

* * * * *